United States Patent [19]

Beikirch

[11] Patent Number: 4,803,556

[45] Date of Patent: Feb. 7, 1989

[54] SCAN LAMP INTENSITY CONTROL FOR RASTER INPUT SCANNERS

[75] Inventor: Thomas R. Beikirch, Webster, N.Y.

[73] Assignee: Xerox Corporation, Stamford, Conn.

[21] Appl. No.: 61,628

[22] Filed: Jun. 15, 1987

[51] Int. Cl.[4] .......................... H04N 5/238; H04N 1/10

[52] U.S. Cl. ..................................... 358/228; 358/293; 358/294

[58] Field of Search ................ 358/228, 282, 293, 294; 355/14 E, 69, 67, 68

[56] References Cited

U.S. PATENT DOCUMENTS

| 3,604,841 | 9/1971 | Ettlinger et al. | 178/5.4 R |
| 4,386,345 | 5/1983 | Narveson et al. | 340/703 |
| 4,677,287 | 6/1987 | Ejima | 358/293 X |

OTHER PUBLICATIONS

Fundamentals of Digital Copiers, Canon Inc., Oct. 1984, pp. 8–13.

Primary Examiner—L. T. Hix
Assistant Examiner—D. Rutledge
Attorney, Agent, or Firm—Frederick E. McMullen

[57] ABSTRACT

Scan lamp intensity control with reflective patch scanned along with each image line, the reflectance signals obtained being later separated from the image signals and compared to a desired intensity level adjusted to the D/A current reference voltage. To maintain operation within the range of photosite offset adjustment, a scan lamp intensity setpoint is obtained at the beginning of scan.

13 Claims, 8 Drawing Sheets

SCAN LAMP INTENSITY CONTROL FOR RASTER INPUT SCANNERS

The invention relates to raster input scanners, and more particularly, to a scan lamp intensity control for maintaining scan lamp intensity substantially constant.

Raster input scanners typically employ one or more linear scanning arrays to scan, on a line by line basis, an image bearing document, scanning normally taking place through a transparent platen on which the document is placed, either manually or automatically. An optical system is provided to focus the array or arrays on the document line being scanned, with a suitable drive or transport mechanism provided for effecting relative line by line stepping motion between the document and the scanning array.

In order to scan, the document line must be illuminated, and for this purpose a scan lamp is provided. However, the illumination intensity of the scan lamp typically does not remain constant but instead changes with time, temperature, operating conditions, age, etc. This variation in lamp intensity can have an adverse effect on the accuracy of the image signals produced and because of this, it is highly desirable that scan lamp intensity remain uniform during scanning. It is further desirable that the time required to bring the scan lamp up to operating intensity be keep to a minimum to enhance scanner operating speeds and productivity.

In the prior art, U.S. Pat. No. 3,604,841 to Ettlinger et al disclose a correction apparatus for encoded color TV signals in which color correction signals in phase relationship with the color reference base signal accompanying the color TV signals are obtained, encoded, and added to the encoded TV signals to provide a corrected and enhanced color TV signal. And, U.S. Pat. No. 4,386,345 to Narveson et al discloses an apparatus for controlling the brightness of a color CRT screen using the signal output of an ambient light sensor to continuously compute a reference brightness for adjusting the CRT brightness level.

In contrast, the present invention provides a method of operating a raster input scanner of the type having at least one linear array of photosensors for scanning an image line by line and generating analog image signals representative of the image line scanned, at least one lamp for illuminating the image for scanning by the array, and a power supply for operating the lamp, in which the steps comprise: with each line scanned, additionally scanning an area of predetermined reflectance to provide reflectance signals with the image signals; separating the reflectance signals from the image signals; deriving a first signal representing current lamp intensity from the reflectance signals; providing a second signal representing desired lamp intensity; comparing at least the first and second signals with one another to provide an error signal; and adjusting the power supply in response to the error signal to control the illumination intensity of the lamp and provide the desired lamp intensity when scanning.

The invention further relates to a raster input scanner, the combination of which comprises: at least one scanning array having a plurality of photosensors, the array having a viewing path for scanning a document line by line to provide analog image signals representative of each line of the document scanned; at least one lamp for illuminating the document; a power supply for operating the lamp; an area of predetermined reflectance interposed in the viewing path of the array whereby the area is scanned with each image line scanned whereby the array analog image signals comprise both reflectance signals from the area and image signals from the document image; means for separating the reflectance signals from the image signals to provide a first signal representing current lamp intensity; means providing a second signal representing desired lamp intensity; comparator means for comparing the first and second signals to provide an error signal; and control means responsive to the error signal for adjusting the power supply to provide the desired lamp intensity.

Figure 1:
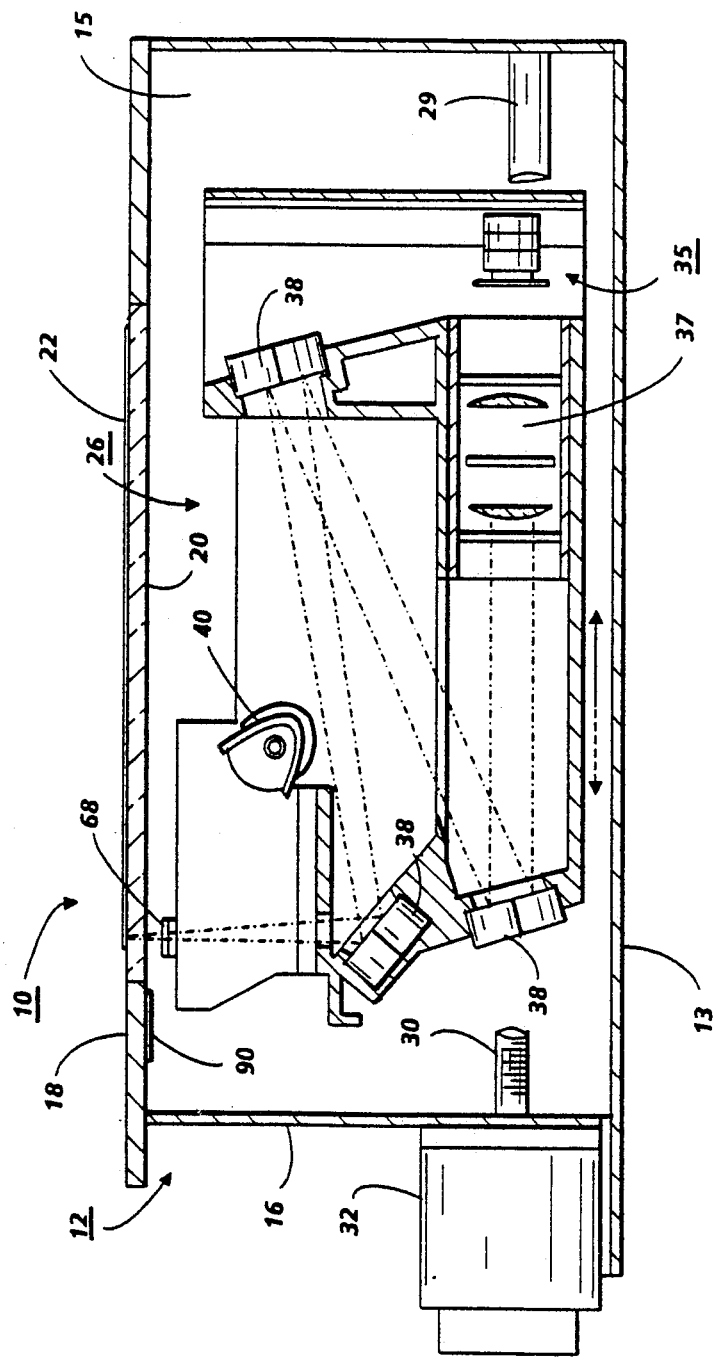
FIG. 1 is a schematic view of a raster input scanner of the type adapted for use with the lamp intensity control of the present invention.

Referring to FIG. 1, there is shown an exemplary raster input scanner, designated generally by the numeral 10, of the type with which the closed loop lamp intensity control 8 (shown in FIG. 2) of the present invention is intended to be used. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, an image bearing document 22 is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. An incandescent lamp 40 on carriage 26 illuminates the line-like area on which array 35 is focused.

Figure 4:
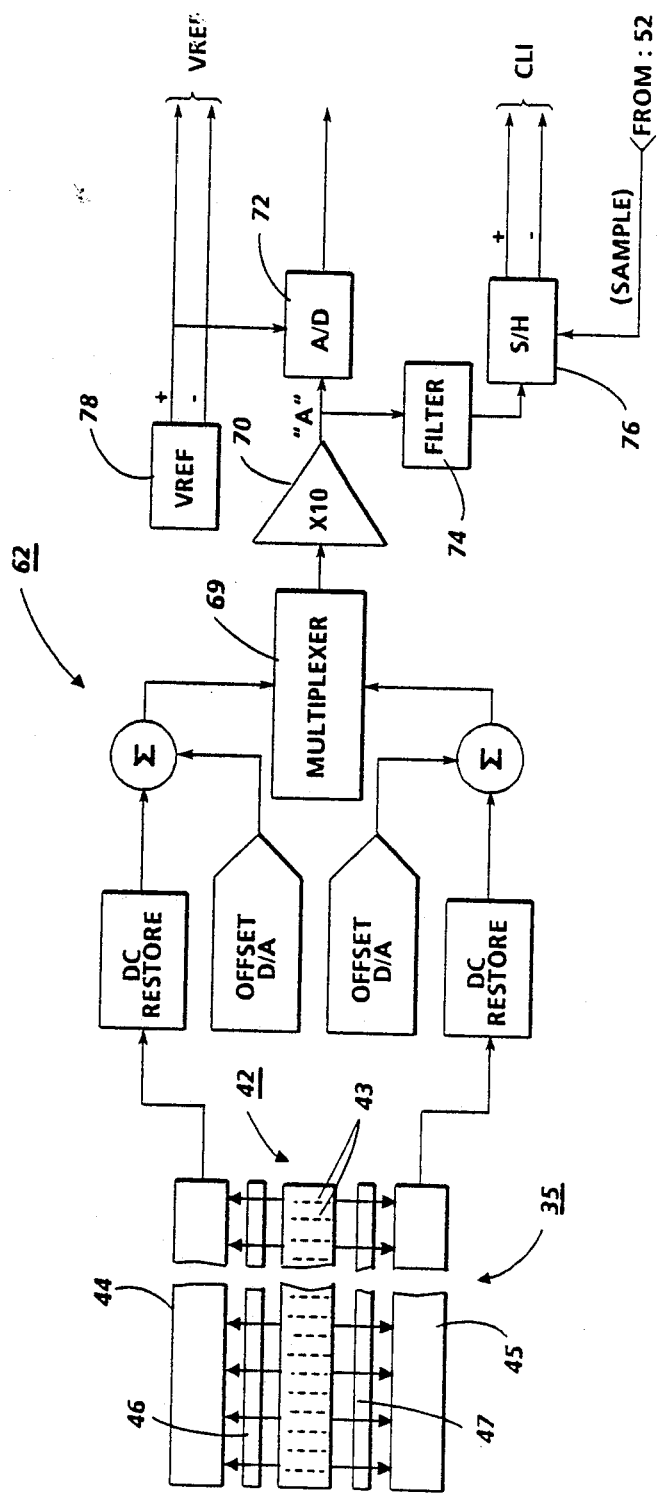
FIG. 4 is a block diagram showing details of the measurement section with the apparatus for separating reflectance signals from image signals.

As shown in FIG. 4, array 35 has a linear row 42 of photosites 43 flanked on each side by shift registers 44, 45. Transfer gates 46, 47 serve to transfer the image signals which are in the form of charge potentials representative of the grey level of the portion of the image viewed by each photosite 43 to shift registers 44, 45, the charge potentials from the even numbered photosites being transferred to shift register 44 while the charge potentials from the odd numbered photosites are transferred to shift register 45.

While a single scanning array 35 is shown and described, plural arrays may instead be envisioned.

Figure 2:
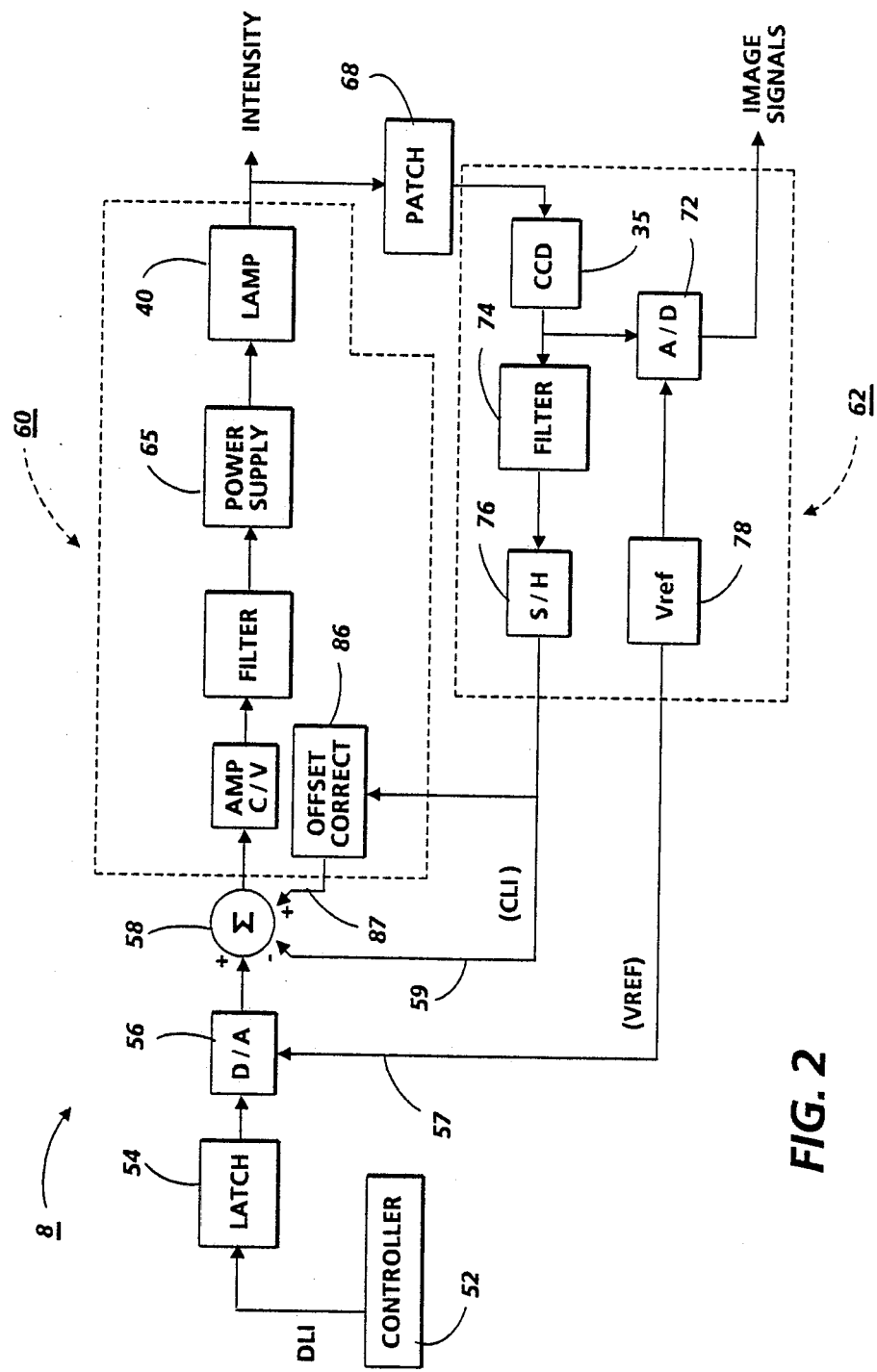
FIG. 2 is functional block diagram of the lamp intensity control of the present invention.

Referring to FIG. 2, lamp intensity control 8 responds to a digital desired lamp intensity signal (DLI) representing the desired lamp intensity level from the scanner microprocessor controller 52. The lamp intensity signal (DLI) is input to a multi-bit latch 54 and digital to analog (D/A) converter 56, the latter converting the digital (DLI) signal to analog. There is also input to D/A converter 56 via line 57 an analog current (VREF) representative of the A/D reference voltage. The output of D/A converter 56, which is proportional to the digital value of the lamp intensity signal (DLI) times the A/D reference voltage (VREF), is input to one node of an analog summing amplifier 58. There, the combined lamp intensity signal and the A/D reference voltage is compared with a current lamp intensity signal (CLI), representing the present intensity of lamp 40, which is input via line 59. The control or error signal output by amplifier 58 is fed to the processing section 60 of lamp intensity control 8 to adjust lamp power supply 65 and provide the lamp intensity called for.

Referring particularly to FIGS. 1 and 2, to monitor the intensity of lamp 40 and obtain a signal representing the intensity of lamp 40 at each scan line, a reflective patch or screen 68 is provided on scan carriage 26. Patch 68 consists of a high reflectance material which is positioned so as to be in the image plane, but below the platen 20. Thus, each time array 35 scans an image line, patch 68, which is also illuminated by lamp 40, is scanned by array 35. A predetermined number (N) of photosites at or adjacent one end of the row 42 of photosites 43, i.e., at the start of scan end, are focused on patch 68. Since patch 68 is mounted on scan carriage 26 and travels with carriage 26, the reflectance signals produced are not dependent upon the document currently being scanned but rather on the intensity of lamp 40, the optical system, and other factors related to the particular scanner. Since the optical system and other factors that might affect intensity are ordinarily constant, the reflectance signals produced from scanning patch 68 are dependent only on the intensity of lamp 40.

Figure 3:
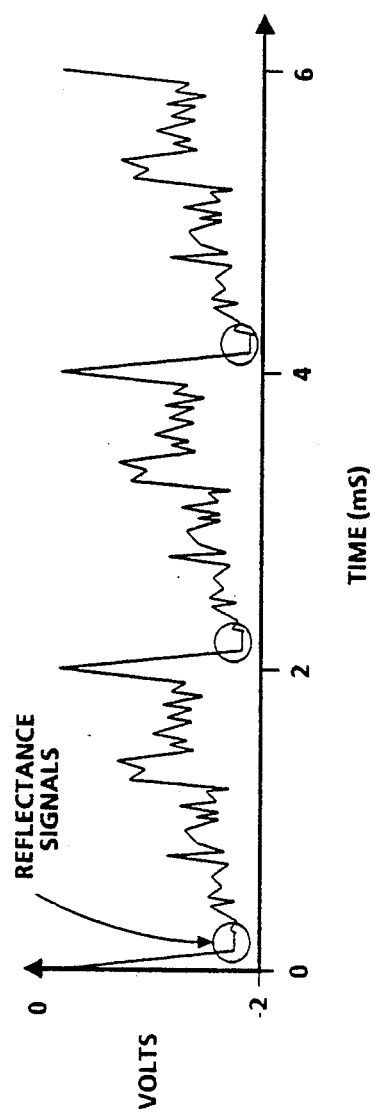
FIG. 3 is a graph showing several exemplary lines of combined reflectance and image signals produced by the scanning array.

The reflectance signals derived from scanning patch 68, which are combined with the image signals derived from scanning the image line (an example of which is shown in FIG. 3) are input to measurement section 62 of lamp intensity control 8 where the reflectance signals are separated from the image signals and input to a second node of amplifier 58 via line 59.

Referring to FIG. 4, the image signals in shift registers 44, 45 of array 35 are clocked out via a multiplexer 69 which combines the image signals into a single stream for input via amplifier 70 to A/D converter 72. Converter 72 converts the analog image signals output by array 35 to digital image signals for further processing and output to the user or work station.

To obtain current lamp intensity signals (CLI), the output of amplifier 70 is tapped (at point 'A') and fed to a single pole low pass filter 74 which removes spurious noise. The filtered signals are output to sample and hold (S/H) circuit 76 where the reflectance signals are separated from the image signals and averaged to provide lamp intensity signal (CLI) for input to amplifier 58 (seen in FIG. 2).

S/H circuit 76 can be envisioned as a single pole switch with one end connected to the signal being sampled and the other end connected to a capacitor. When the switch is closed in response to a sample command (SAMPLE) synchronized with the reflectance signals, the capacitor voltage follows the signal. Additionally, the amplifier section of circuit 76 is connected to function as a low pass filter with a time constant set such that the reflectance signals are averaged into the current lamp intensity signal (CLI) output. The current lamp intensity signal (CLI) output by S/H circuit 76 is in the form of an analog voltage that is directly proportional to the lamp intensity. The signal (CLI) is output differentially to prevent errors as for example that may be caused by different relative ground references between printed wiring boards (PWB) where the circuit components are on different boards and to reduce noise sensitivity.

A precision voltage source 78 provides a reference voltage (VREF) to A/D converter 72 for use by converter 72 as a conversion reference. However, reference voltage (VREF) may drift with temperature and time, and to compensate for any drift that occurs, reference voltage (VREF) is input via D/A converter 56 to summing amplifier 58. To prevent errors of the type discussed heretofore, reference voltage (VREF) is output differentially.

Figure 5:
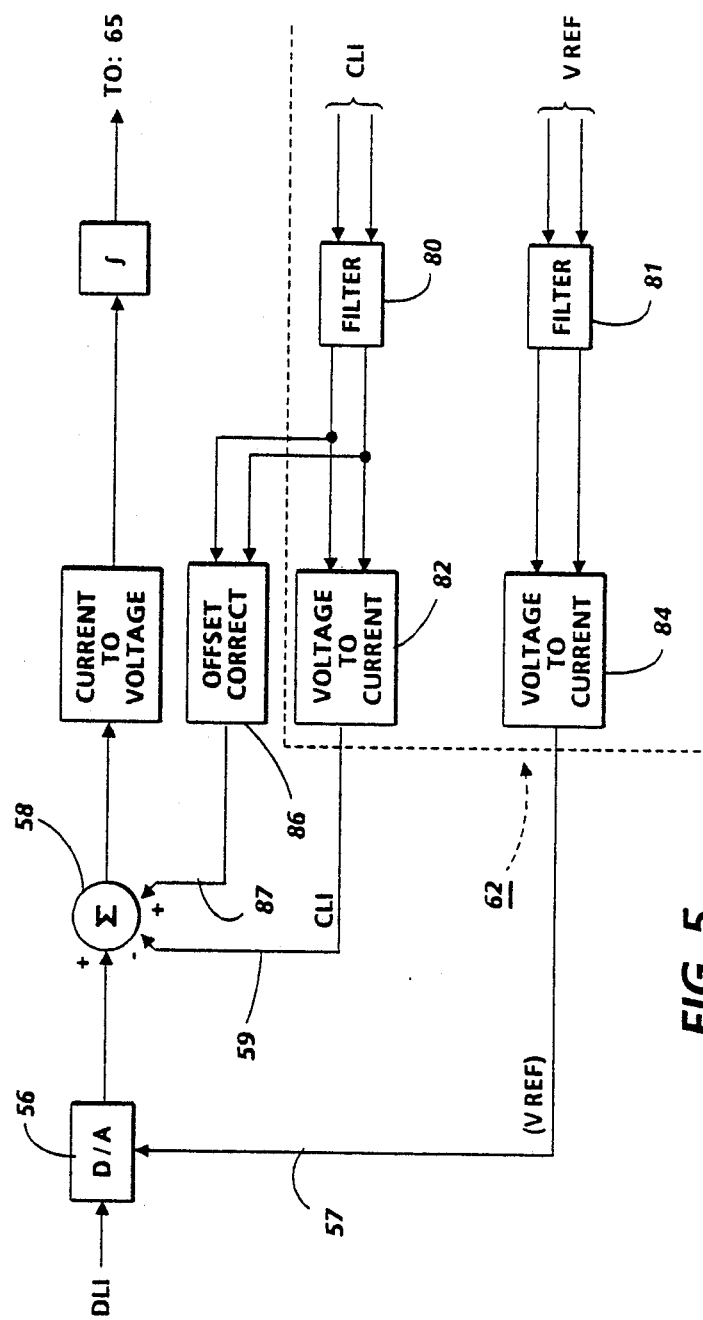
FIG. 5 is a block diagram showing the structure for obtaining lamp intensity controls signal for use in adjusting the intensity of the scan lamp.

Referring now to FIG. 5, the current lamp intensity signals (CLI) from S/H circuit 76 and the reference voltage (VREF) from voltage source 78 are input to filters 80, 81 respectively for filtering. The reference voltage (VREF) output by filter 80 is converted to current by a suitable voltage-to-current circuit 84 for output via line 57 to D/A converter 56 and amplifier 58. Similarly, the current lamp intensity signal (CLI) output of filter 81 is converted to current by a voltage-to-current circuit 82 and output via line 59 to amplifier 58.

The current lamp intensity signal (CLI) output of filter 80 is additionally input to an offset correction circuit 86. The output of circuit 86 is connected to a node of summing amplifier 58 by line 87. Circuit 86 functions as a comparator to determine if the current lamp intensity signal (CLI) is negative. Where the current lamp intensity signal is negative, circuit 86 injects a positive current into summing amplifier 58 to insure that lamp 40 is off.

As will be understood, imperfections in the photosites 43 of array 35 typically result in non-uniformity, as for example cell to cell gain variations, D.C. offsets, etc. between photosensors 43. If not compensated for, the image signal or pixel output of array 35 will provide inaccurate representations of the image line scanned.

To correct for variations such as offset and gain between the array photosensors 43, array 35 is calibrated before use. A calibration value in the form of a correction value is obtained for each photosensor which is thereafter used to adjust the image signal output of each photosensor to correct for any differences between photosensors.

Referring particularly to FIGS. 1 and 4, for calibration purposes, a uniform grey image in the form of a calibration strip 90 is provided for scanning by array 35. Typically, a plurality (N) of calibration scans are carried out during a prescan cycle to obtain a correction value for the image signal output of each photosensor 43. The calibration signals produced on each scan of calibration strip 90, after being converted to digital format by A/D converter 72, are compared with a chosen reference voltage to obtain the correction values. The correction values are stored in a suitable memory. During subsequent scanning, the correction values are read from the memory in timed synchronization with the image signal output of the individual photosensors and used to adjust or correct as by multiplying, the image signal output the array photosensor.

However, the range or degree of correction may be limited by the system design; that is, the system may only by capable of correcting the raw image signals by a preset amount (i.e., between 1n and 2n). A basic goal, therefore, of lamp intensity control 8 is to set the lamp intensity level (lamp set point) so that both the weakest and the strongest image signals can be corrected to the desired grey level based on the reflectance of calibration strip 90.

Figure 6:
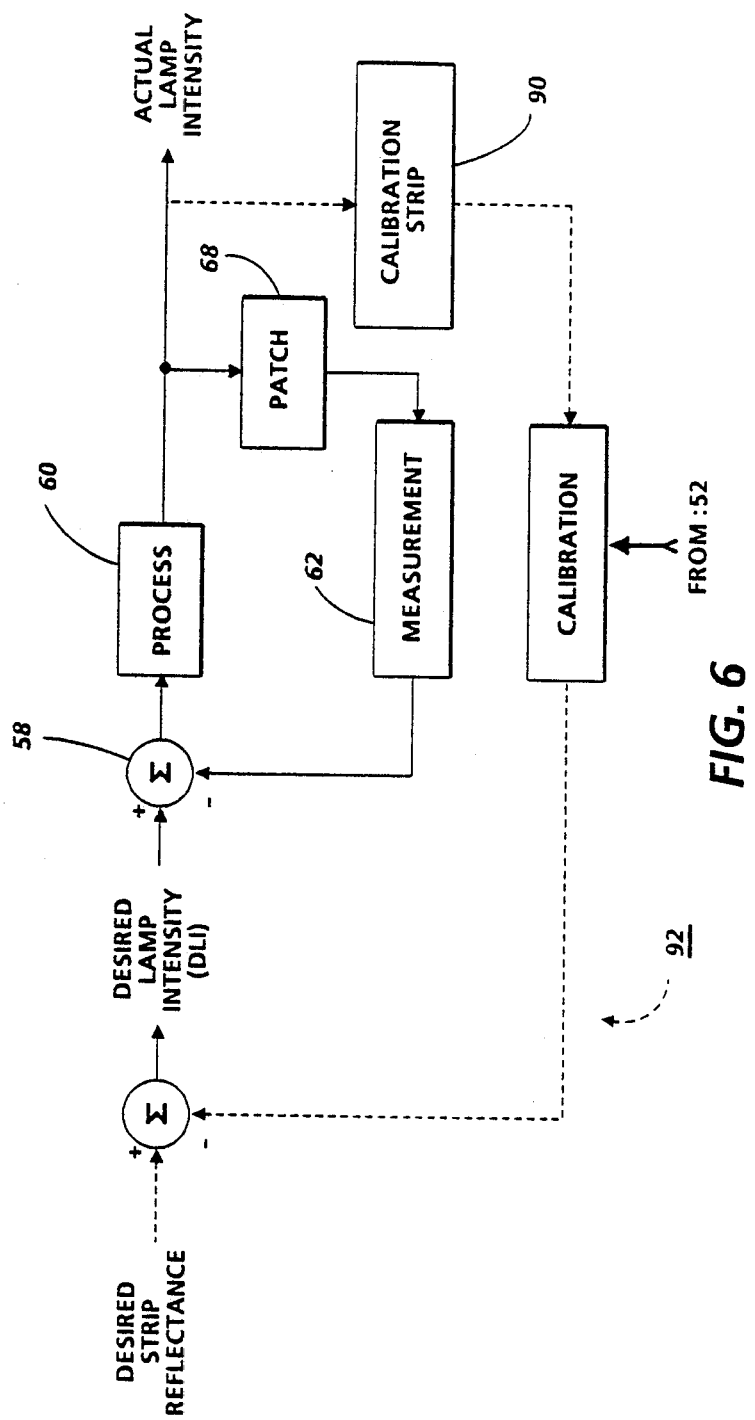
FIG. 6 is a block diagram illustrating the manner in which prescan calibration is carried out.
Figure 7:
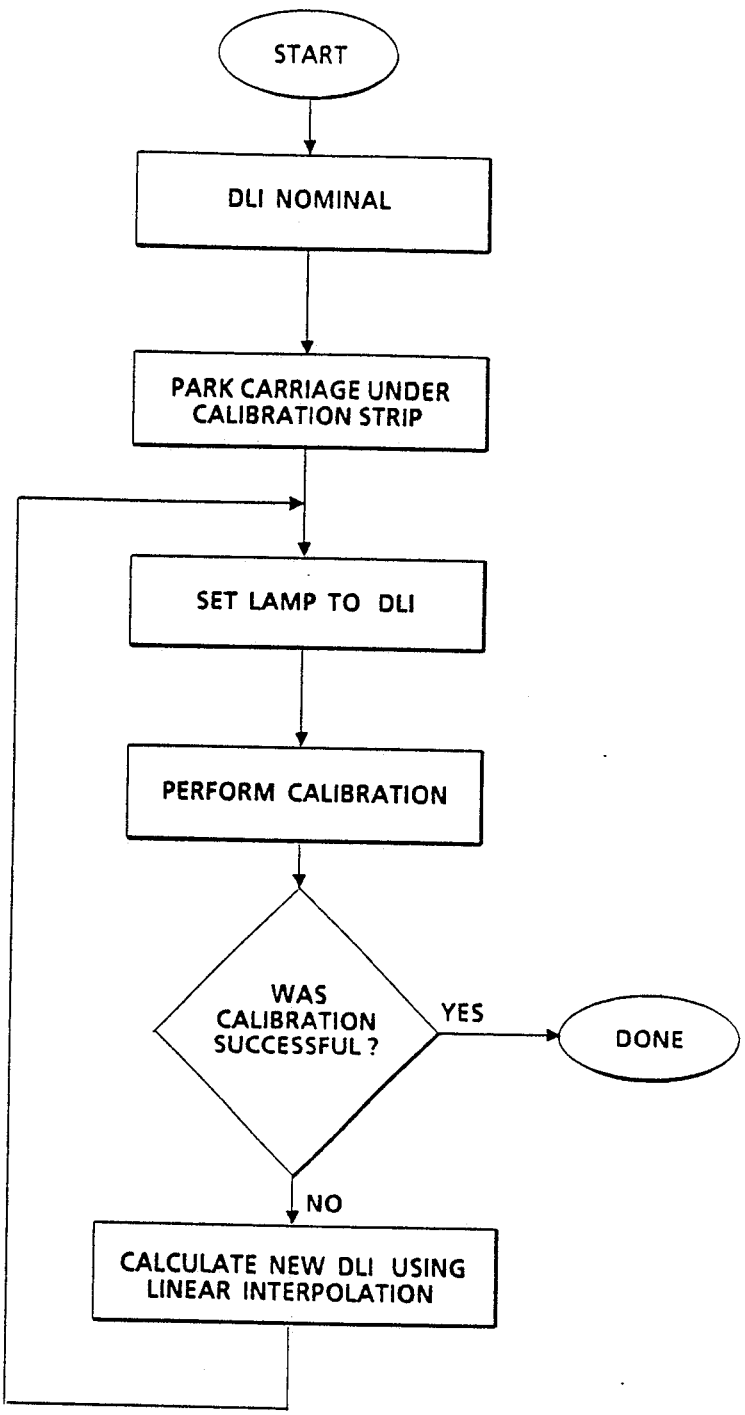
FIG. 7 is a flow chart of the pre-scan calibration cycle.

In order to obtain the lamp set point, and referring to FIGS. 6 and 7, controller 52 sets up a temporary calibration control loop in software (shown in dotted lines and identified by numeral 92) around lamp intensity control 8. During a prescan cycle, scan carriage 26 is parked under calibration strip 90, the desired lamp intensity (DLI) is set to an initial trial set point value, and calibration is carried out. It is understood that calibration strip 90 has a known and controlled reflectance. Several scan lines of data are obtained using the initial value of desired lamp intensity (DLI), averaged to reduce sensitivity to noise of both the scanner and on the calibration strip itself, and processed to provide correction values for adjusting the image signal outputs of the array photosensors to provide uniform photosensor outputs.

If the trial DLI value chosen is correct and the intensity of lamp 40 is at the proper level, the average value of the several scan lines of data obtained will be equal to the known reflectance of calibration strip 90 (WAS CALIBRATION SUCCESSFUL?). The process is accordingly completed (DONE) and the set point obtained. If not, the difference between the desired strip reflectance and the actual strip reflectance measurement is used to calculate a new set point value for desired lamp intensity (CALCULATE NEW DLI). Adjusting lamp intensity to the new value, the process is repeated until the strip reflectance obtained is equal to the known reflectance of calibration strip 90 and the set point established. In the event calibration is not achieved after a preset number of tries, that is, the range of correction requires a set point that is either too high or too low, a fault is indicated. In the case where the set point is too high, it is understood that power input to lamp 40 would be too high, making the lamp too bright and resulting in premature lamp burn out. Where the set point is too low, the power to lamp 40 would be insufficient to sustain the halogen cycle.

On completion of the process, the desired intensity value (DLI) obtained is stored and used to provide an intensity set point for lamp 40 for all subsequent scans until the next calibration.

Figure 8:
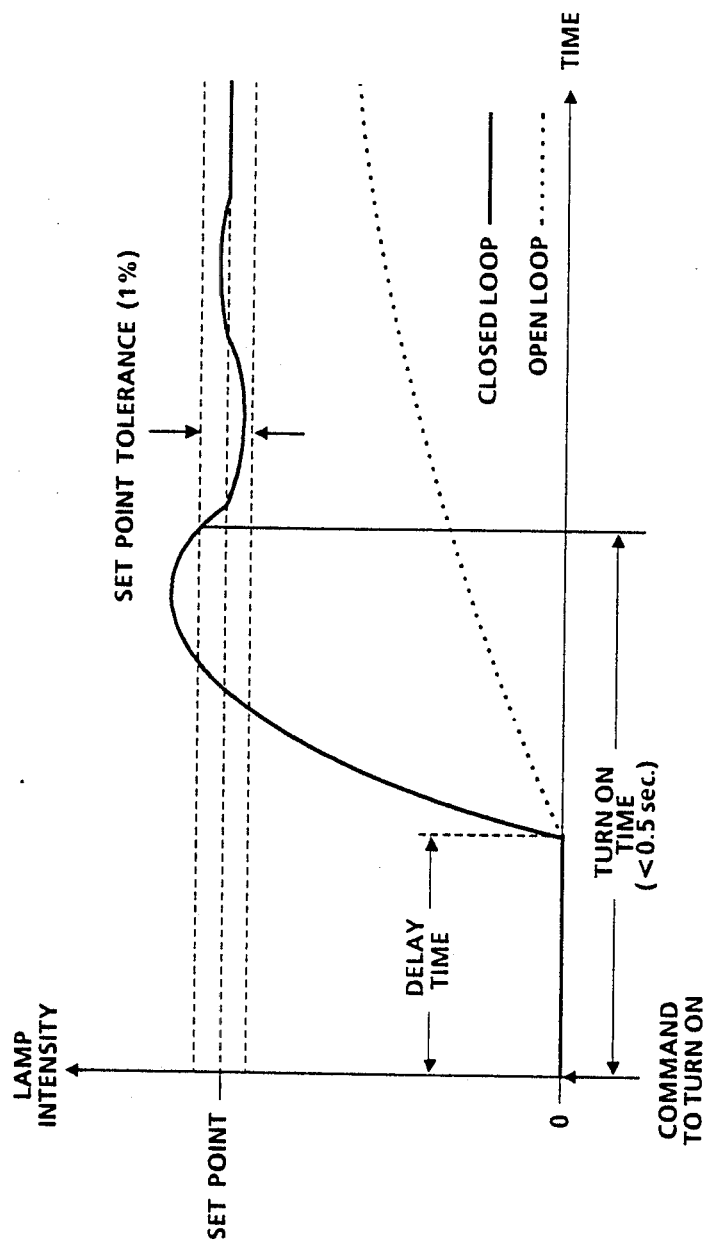
FIG. 8 is a graph of time vs. lamp intensity depicting the operation of the lamp intensity control of the present invention in maintaining scan lamp intensity constant within a preselected tolerance through closed loop control versus an unregulated open loop control.

As depicted by FIG. 8, the closed loop lamp intensity control 8 of the present invention dramatically reduces the turn on time required to bring lamp 40 up to the desired set point as compared with an open loop system where the rise time is substantially longer. Further, an open loop system may not result in the lamp intensity ever attaining the desired set point or, having attained the set point, unable to retain lamp intensity within the very close tolerances desired as are held by lamp intensity control 8.

While the invention has been described with reference to the structure disclosed, it is not confined to the details set forth, but is intended to cover such modifications or changes as may come within the scope of the following claims.

I claim:

1. A method of operating a raster input scanner having at least one linear array of photosensors for scanning an image line by line and generating analog image signals representative of the image line scanned, at least one lamp for illuminating the image for scanning by said array, and an adjustable power supply for operating said lamp, comprising the steps of:
   (a) with each line scanned, additionally scanning an area of predetermined reflectance to provide reflectance signals with said image signals;
   (b) separating the reflectance signals from said image signals;
   (c) deriving a first signal representing current lamp intensity from said reflectance signals;
   (d) providing a second signal representing desired lamp intensity;
   (e) comparing at least said first and second signals with one another to provide an error signal; and
   (f) adjusting said power supply in response to said error signal to control the illumination intensity of said lamp and provide said desired lamp intensity when scanning.

2. The method according to claim 1 in which said raster input scanner further includes circuit means for processing the image signals output by said array including A/D converter means for converting the analog image signals output by said array to digital image signals and means providing a reference potential for operating said A/D converter means, including the step of:
   (a) comparing said first and second signals with said reference potential to provide said error signal; and
   (b) adjusting said power supply in response to said error signal to provide said desired lamp intensity level despite changes in said reference potential and/or changes in lamp operating conditions.

3. The method according to claim 1 including the steps of:
   (a) testing the polarity of said first signal; and
   (b) where said first signal has a predetermined polarity, inactivating said power supply to turn said lamp off.

4. The method according to claim 1 including the steps of:
   (a) before scanning said image, providing a trial signal for adjusting said power supply to provide a predetermined lamp intensity;
   (b) adjusting said power supply in response to said trial signal to provide said predetermined lamp intensity;
   (c) scanning a calibration image to provide calibration signals;

(d) comparing said calibration signals derived from scanning said calibration image with a control signal representing the known reflectance of said calibration image;
(e) where said calibration signals and said control signal are equal, using said trial signal to provide said second signal;
(f) where said calibration signals and said control signal are different, providing a new trial signal;
(g) adjusting said power supply in response to said new trial signal to provide a different predetermined lamp intensity; and
(h) repeating steps b, c, d, e, and f until a trial signal is provided where said calibration signals and said control signal are equal.

5. A method of operating a raster input scanner having at least one linear array of photosensors for scanning an image line by line to produce analog image signals representative of the image line scanned, at least one lamp for illuminating the image for scanning by said array, and a power supply for operating said lamp, comprising the steps of:
(a) with each line scanned, additionally scanning an area of predetermined reflectance to provide reflectance signals;
(b) separating the reflectance signals from said image signals;
(c) deriving a current lamp intensity signal from said reflectance signals representing current lamp intensity;
(d) providing a desired lamp intensity signal;
(e) comparing said current lamp intensity signal with said desired lamp intensity signal to provide an error signal; and
(f) adjusting said power supply in response to said error signal to maintain the illumination intensity of said lamp substantially uniform despite changes in lamp operating conditions.

6. The method according to claim 5 including the steps of:
(a) testing the polarity of said current lamp intensity signal; and
(b) where said current lamp intensity signal has a negative polarity, inactivating said power supply to turn said lamp off.

7. The method according to claim 5 in which said raster input scanner further includes circuit means for processing the image signals output by said array including A/D converter means for converting the analog image signals output by said array to digital image signals and means providing a reference potential for operating said A/D converter means, including the steps of:
(a) comparing said current and desired lamp intensity signals with said reference potential to provide said error signal; and
(b) adjusting said power supply in response to said error signal to provide said desired lamp intensity level despite changes in said reference potential and/or changes in lamp operating conditions.

8. The method according to claim 5 including the step of:
obtaining said desired lamp intensity signal by calibrating said array photosensors before scanning said image.

9. A method of operating a raster input scanner having at least one linear array of photosites for scanning an image line by line to produce analog image signals representative of the image line scanned, at least one lamp for illuminating the image for scanning by said array, a power supply for operating said lamp, and circuit means for processing the image signals output by said array including converter means for converting the analog image signals output by said array to digital image signals and means providing a reference potential for operating said converter means, comprising the steps of:
(a) with each line scanned, additionally scanning an area of predetermined reflectance to provide reflectance signals;
(b) separating the reflectance signals from said image signals;
(c) deriving a current lamp intensity signal from said reflectance signals representing current lamp intensity;
(d) outputting said image signals to said circuit means for processing including conversion of said image signals to digital image signals by said converter means;
(e) comparing said current lamp intensity signal with said reference potential to provide an error signal; and
(f) adjusting said power supply in response to said error signal to maintain the illumination intensity of said lamp substantially uniform despite changes in said reference potential and/or changes in lamp operating conditions.

10. A method of operating a raster input scanner having at least one linear array of photosites for scanning an image line by line and generating analog image signals representative of the image line scanned, at least one lamp for illuminating the image for scanning by said array, a power supply for operating said lamp, and circuit means for processing the image signals output by said array including A/D converter means for converting the analog image signals output by said array to digital image signals and means providing a reference potential for operating said A/D converter means, comprising the steps of:
(a) with each line scanned, additionally scanning an area of predetermined reflectance to provide reflectance signals with said image signals;
(b) separating the reflectance signals from said image signals;
(c) deriving a first signal representing current lamp intensity from said reflectance signals;
(d) providing a second signal representing desired lamp intensity;
(e) providing a third signal representing said reference potential;
(f) comparing said first, second and third signals with one another to provide an error signal; and
(g) adjusting said power supply in response to said error signal to control the illumination intensity of said lamp and provide said desired lamp intensity despite changes in said reference potential and/or changes in lamp operating conditions.

11. In a raster input scanner, the combination of:
(a) at least one scanning array having a plurality of photosensors, said array having a viewing path for scanning a document line by line to provide analog image signals representative of each line of said document scanned;
(b) at least one lamp for illuminating said document;
(c) a power supply for operating said lamp;
(d) an area of predetermined reflectance interposed in the viewing path of said array whereby said area is scanned with each image line scanned whereby said array analog image signals comprise both reflectance signals from said area and image signals from the document image;

(e) means for separating said reflectance signals from said image signals to provide a first signal representing current lamp intensity;

(f) means providing a second signal representing desired lamp intensity;

(g) comparator means for comparing said first and second signals to provide an error signal; and (h) control means responsive to said error signal for adjusting said power supply to provide said desired lamp intensity.

12. The scanner according to claim 11 including
 (a) A/D converter means for converting said analog image signals to digital image signals; and
 (b) means providing a reference potential for said A/D converter means;
said comparator means comparing said first and second signals with said reference potential to provide said error signal.

13. The raster scanner according to claim 11 including means responsive to a predetermined first signal level for inactivating said power supply to turn off said lamp.

* * * * *